(12) United States Patent
Gardell et al.

(10) Patent No.: US 7,404,010 B1
(45) Date of Patent: Jul. 22, 2008

(54) METHODS AND APPARATUS FOR INTEGRATING SERVICES FOR ACCESSING THE WORLD WIDE WEB

(75) Inventors: Steven E. Gardell, North Andover, MA (US); Denise A. Nelson, Medway, MA (US); Bruce Reichlen, Acton, MA (US)

(73) Assignees: Verizon Corporate Services Group Inc., New York, NY (US); Level 3 Communications, LLC, Broomfield, CO (US)

( * ) Notice: Subject to any disclaimer, the term of this patent is extended or adjusted under 35 U.S.C. 154(b) by 0 days.

(21) Appl. No.: 09/460,455

(22) Filed: Dec. 13, 1999

Related U.S. Application Data

(63) Continuation of application No. 08/800,907, filed on Feb. 13, 1997, now Pat. No. 6,049,831.

(51) Int. Cl.
*G06F 15/16* (2006.01)
*H04N 7/173* (2006.01)

(52) U.S. Cl. .................. 709/246; 709/227; 725/105; 725/115

(58) Field of Classification Search ......... 709/236, 709/230, 231, 246, 217–219, 227; 725/48, 725/51, 54, 109, 110, 111, 115, 105, 112, 725/118
See application file for complete search history.

(56) References Cited

U.S. PATENT DOCUMENTS

| | | | | |
|---|---|---|---|---|
| 5,457,776 A | * | 10/1995 | Wong et al. | 715/516 |
| 5,654,886 A | * | 8/1997 | Zereski et al. | 702/3 |
| 5,727,159 A | * | 3/1998 | Kikinis | 709/246 |
| 5,742,762 A | * | 4/1998 | Scholl et al. | 709/200 |
| 5,745,909 A | * | 4/1998 | Perlman et al. | 715/513 |
| 5,748,188 A | * | 5/1998 | Hu et al. | 345/853 |
| 5,805,815 A | * | 9/1998 | Hill | 709/218 |
| 5,848,427 A | * | 12/1998 | Hyodo | 715/513 |
| 5,901,286 A | * | 5/1999 | Danknick et al. | 709/203 |
| 5,903,816 A | * | 5/1999 | Broadwin et al. | 725/110 |
| 5,918,013 A | * | 6/1999 | Mighdoll et al. | 709/217 |
| 5,918,014 A | * | 6/1999 | Robinson | 709/219 |
| 6,006,257 A | * | 12/1999 | Slezak | 725/110 |
| 6,049,831 A | * | 4/2000 | Gardell et al. | 709/236 |
| 6,862,264 B1 | * | 3/2005 | Moura et al. | 370/229 |

* cited by examiner

*Primary Examiner*—Glenton B. Burgess
*Assistant Examiner*—Aaron Strange

(57) ABSTRACT

Web pages retrieved by a browser core are translated into user interface component definitions and page information. The definitions and page information are transmitted to a user device which recomposes the definitions and page information into a format for presentation to a user on a user device. Transmitting the definitions and page information includes translation of the definitions and page information into a format appropriate for both the particular communications media on which the information is transmitted, and the device to which the information is transmitted. The device includes a browser client which performs the recomposition. The browser client also receives user input, and may respond by altering the information locally at the user device, and sending information related to the user selection back to the browser core for further processing. The browser core also tracks user sessions, thus allowing a user to access the network from several devices, and capture session information for each access from each device. This allows users to switch devices, and start a new session at the point where a previous session ended.

22 Claims, 8 Drawing Sheets

METHODS AND APPARATUS FOR INTEGRATING SERVICES FOR ACCESSING THE WORLD WIDE WEB

This application is a continuation of U.S. application Ser. No. 08/800,907, filed Feb. 13, 1997, now issued as U.S. Pat. No. 6,049,831, which is incorporated herein by reference.

I. BACKGROUND OF THE INVENTION

A. Field of the Invention

The present invention relates generally to accessing a network, and in particular to apparatus and methods for accessing of a network using a variety of types of apparatus, such as a set top box for a television or a computer. The present invention also captures session information in a centralized location during accessing, thus allowing a user integrated access to the network across multiple sessions.

B. Description of the Prior Art

The Internet, and in particular the World Wide Web, is changing many aspects of technology. Each day there is more content and different types of content being made available on the Web. There is also a constant development of technologies to either retrieve content from the Web or provide or push content onto the Web. There are, however, many types of content retrieving and pushing devices. This creates constraints on the operations which may be carried out by Web users.

Numerous technical approaches have been proposed for solving this problem. For example, several television manufacturers are planning to integrate Internet access directly into the television; and computer manufactures are looking to integrate television capabilities directly into the home computer. But even these attempts at integration fail to provide a simple and elegant solution for providing Internet access. These attempts require purchase of new Internet-ready devices in which several different, expensive, components are integrated together into one unit.

Some points of access, such as a set top box (STB) or telephone screenphone, might be managed directly by one entity. Others points of access, such as a Web session initiated in a work environment or from a hotel room might be managed by a totally different entity.

Adding to the problem of multiple points of access is the proliferation of Web access technologies. Each access device has different strengths and weaknesses. For example, a computer is most suitable for viewing Web sites with a high text content. Web sites with a high motion video or sound content, however, are best visited from an entertainment console. A Web site that provides telephone directory services might be best visited from a screen phone.

It thus would be desirable to provide apparatus and methods which allow more flexible ways of accessing networks, particularly the Web.

II. SUMMARY OF THE INVENTION

The invention allows users to receive network information using a variety of devices. The invention also allows users to move seamlessly between sessions on different network access devices. Systems consistent with the present invention, which enables accessing network-related information, comprise means for receiving a request for first network information; means for retrieving first network information having interactive elements; means for analyzing the first network information and creating second network information comprising definitions based on characteristics of the interactive elements; and means for transmitting the second network information and the definitions.

Systems consistent with the present invention, which also handles network information transfer between a network and a user device, comprise means for receiving a network request from a user device for first network information; means for retrieving the first network information; means for processing the first network information to create second network information comprising a user interface element definition and display information; means for transmitting the second network information over a communications media; and means for receiving the second network information and recomposing the second network information to form third network information for the user device.

Systems consistent with the present invention, which implements the transfer of network information, comprise means for receiving a user interface element definition related to a network information request; means for receiving first network information related to the interface element definition and the request; means for recomposing using the user interface element definition and the network information to form device information; and means for presenting the device information to a device.

It is to be understood that both the foregoing general description and the following detailed description are exemplary and explanatory only and are not restrictive of the invention as claimed.

III. BRIEF DESCRIPTION OF THE DRAWINGS

The accompanying drawings, which are incorporated in and constitute a part of this specification, illustrate embodiments of the invention and together with the description, serve to explain the principles of the invention.

IV. DETAILED DESCRIPTION

Reference will now be made in detail to embodiments of the invention, examples of which are illustrated in the accompanying drawings. One embodiment disclosed herein integrates access to various types of services including Web-based services. The architecture in accordance with this embodiment splits a traditional Web browser into two components. The larger and more computationally intensive front-end component resides on a browser server. A smaller component, the browser client, is resident in a device, such as an STB.

Figure 1:
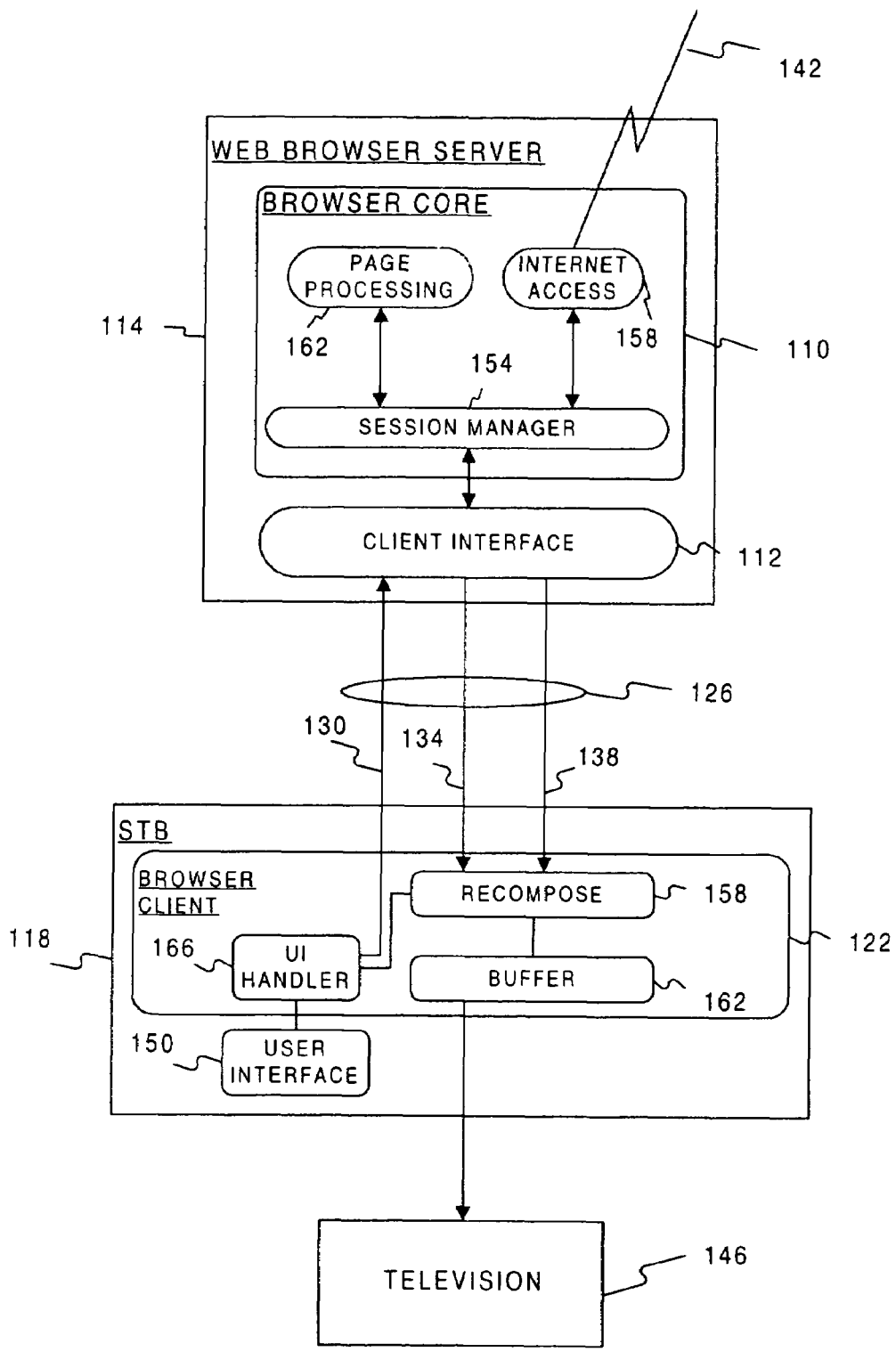
FIG. 1 is a block diagram showing a set top box software and network accessing elements and operations consistent with the present invention.

FIG. 1 is a block diagram showing an embodiment of an Internet accessing system using STB 118 and web browser server 114. STB 118, like a typical STB, receives user selections via user interface (UI) 150 and responds by displaying a particular channel on television 146. In addition to making channel selections STB 118 may respond to user input by altering the image being displayed on television 146, and sending signals regarding user input to Web browser server 114.

A user may tune to an Internet access channel using user interface 150. Session manager 154 detects this, and presents the user with a simple login sequence. The user responds to the login sequence using user interface 150. The user is then presented with a complete Web browsing environment by session manager 154. For example, session manager 154 might present the user with a menu of selectable Web pages. From the menu, Uniform Resource Locators (URLs), or other Web-related selections, can then be entered using user interface 150.

Browser client 122 passes user selections for Web pages to Web browser server 114. In response, Web browser server 114 retrieves the requested Web page by accessing the Internet via high capacity Internet link 142, such as a T1 or ISDN line. The retrieved Web page is processed by browser core 110, and sent to STB 118. The processed page information is further processed by STB 118, and the results are displayed on television 146. In this way, a user views Web pages using television 146.

FIG. 1 shows a single STB 118 connected to Web browser server 114. In one preferred embodiment, Web browser server 114 handles multiple sessions of STB Internet access, and multiple STBs connect to Web browser server 114 via hybrid fiber coax (HFC) 126.

Web browser server 114 comprises client interface 112 and browser core 110. Client interface 112 translates information from session manager 154 into a format appropriate for browser client 122. For example, client interface 112 may receive a Windows bit map or a HyperText Markup Language (HTML) page from session manager 154, and translate the page into an MPEG I-Frame for transfer over path 138. Each type of browser client 122 has a respectively unique client interface 112.

Browser client 122 and browser client interface 112 are designed according to the particular nature of each client. For example, instead of an STB, the client might be a screenphone or computer. Each type of client has different user interface requirements, depending on the client. For example, a computer client connected to Web browser server 114 would have different client interface and browser client requirements than Personal Digital Assistants (PDAs) or screenphones. Screenphones, for example, have monochrome displays and poor resolution and therefore do not require complex graphics.

By using client interfaces tailored to types of clients, browser core 110 can be connected to multiple types of clients in a more flexible manner. Browser core 110, however, may also be implemented to interact directly with browser client 122. Client interface 112 would not be required in this case.

Browser core 110 performs three primary functions: accessing the Internet to retrieve pages in response to user requests, processing the pages, and managing sessions of users accessing the Internet via their STB 118. Browser core 110 is comprised of session manager 154, page processing 162, and Internet access 158. Session manager 154 receives requests for Internet pages from browser client 122 (via client interface 112), retrieves the pages using Internet access 158, and processes the retrieved pages using page processing 162.

Figure 2:
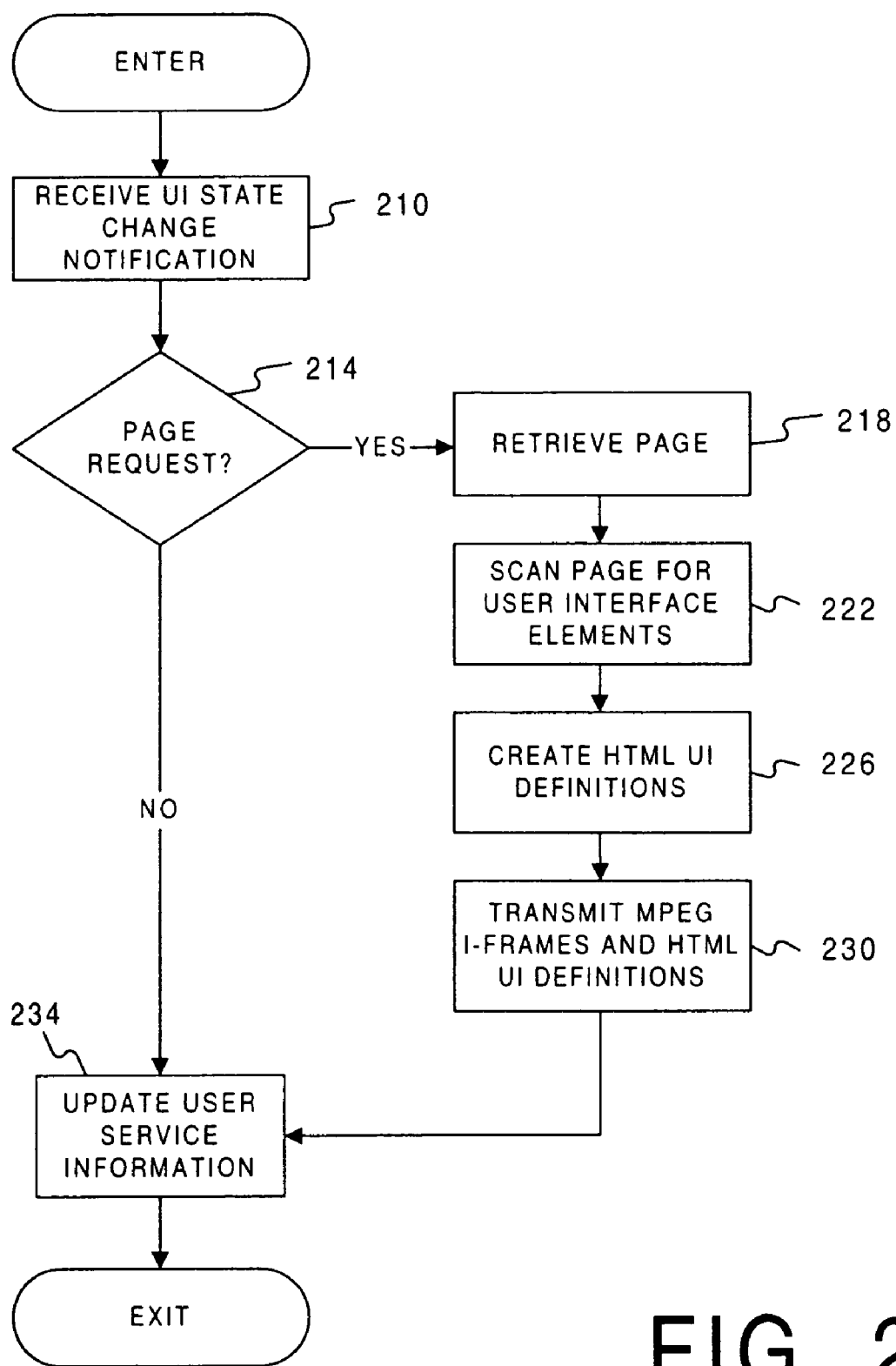
FIG. 2 is a flowchart showing the processing performed by an Internet access device consistent with the present invention.

FIG. 2 is a block diagram showing the functions performed by browser core 110 when accessing the Internet. Session manager 154 receives HTML UI state change notification from STB 118 on UI state change line 130 (step 210). If the notification is not a page request (step 214), the request relates to a local function, and session manager 154 responds by updating user service information associated with the user (step 234), presenting new image information over paths 134 and 138, or by updating and presenting new image information.

If the request is for an Internet page (step 214), session manager 154 retrieves the page using Internet access 158 (step 218). Upon receiving the retrieved page from Internet access 158, session manager 154 sends the information to page processing 162.

Page processing 162 scans the retrieved page for interactive user interface elements and strips them out (step 222), and creates HTML UI definitions based on the interactive user interface elements found in the page (step 226). All of the user interface elements are stripped from the incoming Internet signal and the resulting display signal is sent over stream 138 to STB 118. The second stream 134 from the server are the definitions of the interactive user interface elements found in the Internet signal.

HTML UI definitions are a coded description of graphical user interface elements in a Web page. A definition encodes, for example, where a graphics field is, the visual characteristics of the field, what the current default value is, and other characteristics. Types and characteristics of user interface elements are well described in the HTML specification.

For example, the scan may discover a text input field. A corresponding HTML UI definition is created which encodes the appearance of the text input field, the location of the text input field, and any other characteristics the text input field might have. The definition may include default values for the text. Other examples include radio buttons, check boxes, hot spots, hot links in the text itself, and graphics images that are pickable.

The HTML UI definitions are transferred to session manager 154, which transmits the definitions and Web page to client interface 112. Client interface 112 translates the definitions to a format appropriate for transmission over path 134, and translates the Web page into an MPEG I-Frame for transmission over path 138 (step 230). Session manager 154 updates the user service information to reflect this transmission (step 234).

Figure 3:
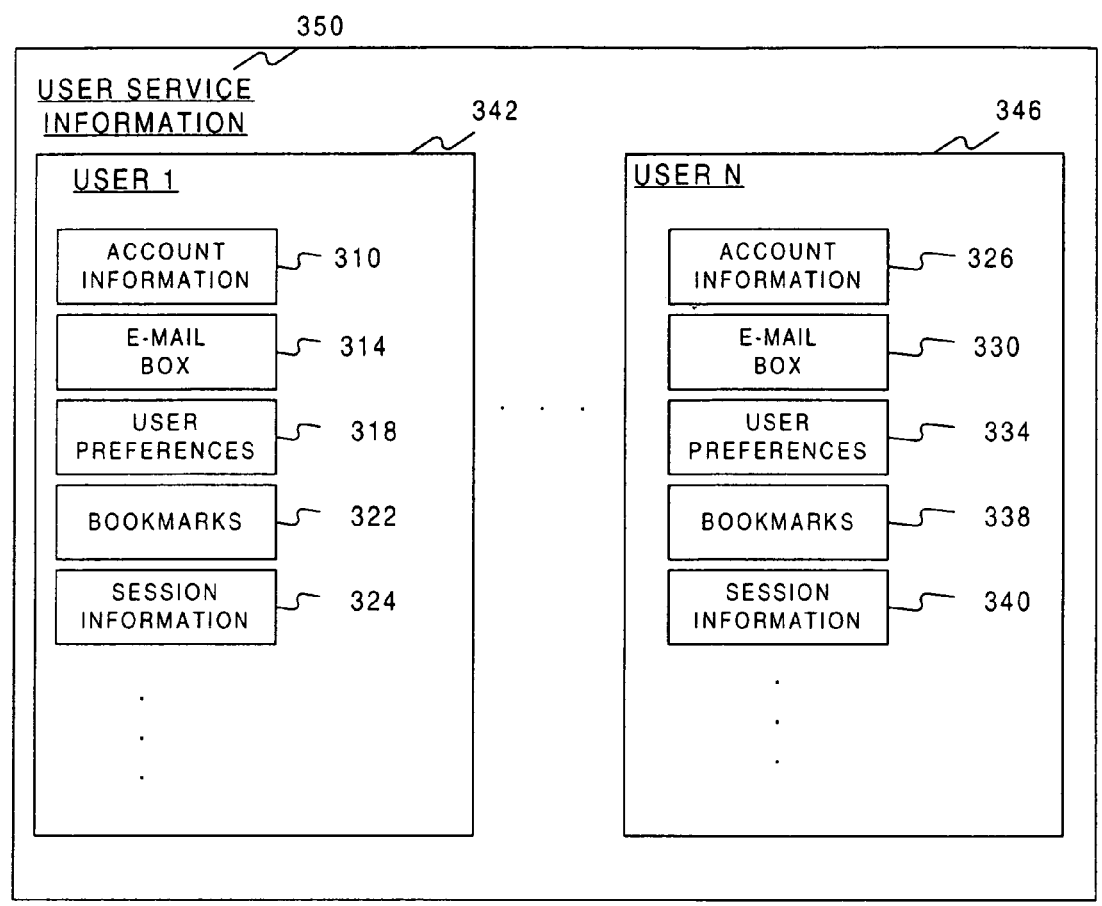
FIG. 3 is a block diagram showing the user service information maintained by an Internet access service consistent with the present invention.

FIG. 3 is a block diagram showing user service information 350 managed by session manager 154. User service information 350 contains information necessary for tracking each user of the system. In FIG. 3, for example, the information represents handling USER 1 342 through USER N 346. Some of service information 350 is similar to service information managed by Internet service providers. The information for USER 1 342 includes account information 310, an e-mail box 314, user preferences 318, bookmarks 322, and session information 324. Each user has similar information, as shown by USER N 346 information: account information 326, an e-mail box 330, user preferences 334, bookmarks 338, and session information 340.

Account information 310 may include billing information and hourly billing rates. Session information 340 may include checkpointing. Checkpointing captures the state of a session, thus allowing a user to bring up a browser on another device and be in exactly the same state. By centralizing e-mail box 330, devices may view and acknowledge plain-text electronic mail and news. User preference information may include most-recently accessed pages, and most frequently accessed pages.

STB 118 performs two functions: processing image information from Web browser server 114 for display on television 146, and responding to user input received via user interface 150. User interface 150 may be any user interface for inputting selections, such as a keyboard, mouse, joystick or infrared remote control. STB 118 includes browser client 122 and user interface 150.

Image information is received by recompose 158, which recomposes an image for display, and transfers the recomposed image to buffer 162. The image is then transmitted to television 146. Systems consistent with the present invention may also be used with devices other than televisions. In such systems, the information received would be recomposed according to the particular audio-visual requirements of the attached device.

UI handler 166 receives user input from user interface 150, and determines whether recomposing should be performed by recompose 158, whether information should be sent back to browser core 110, or both. UI handler 166 may have predefined responses to user input, or may be modified to respond in a particular manner based on definition information received over path 134, via recompose 158.

Figure 4:
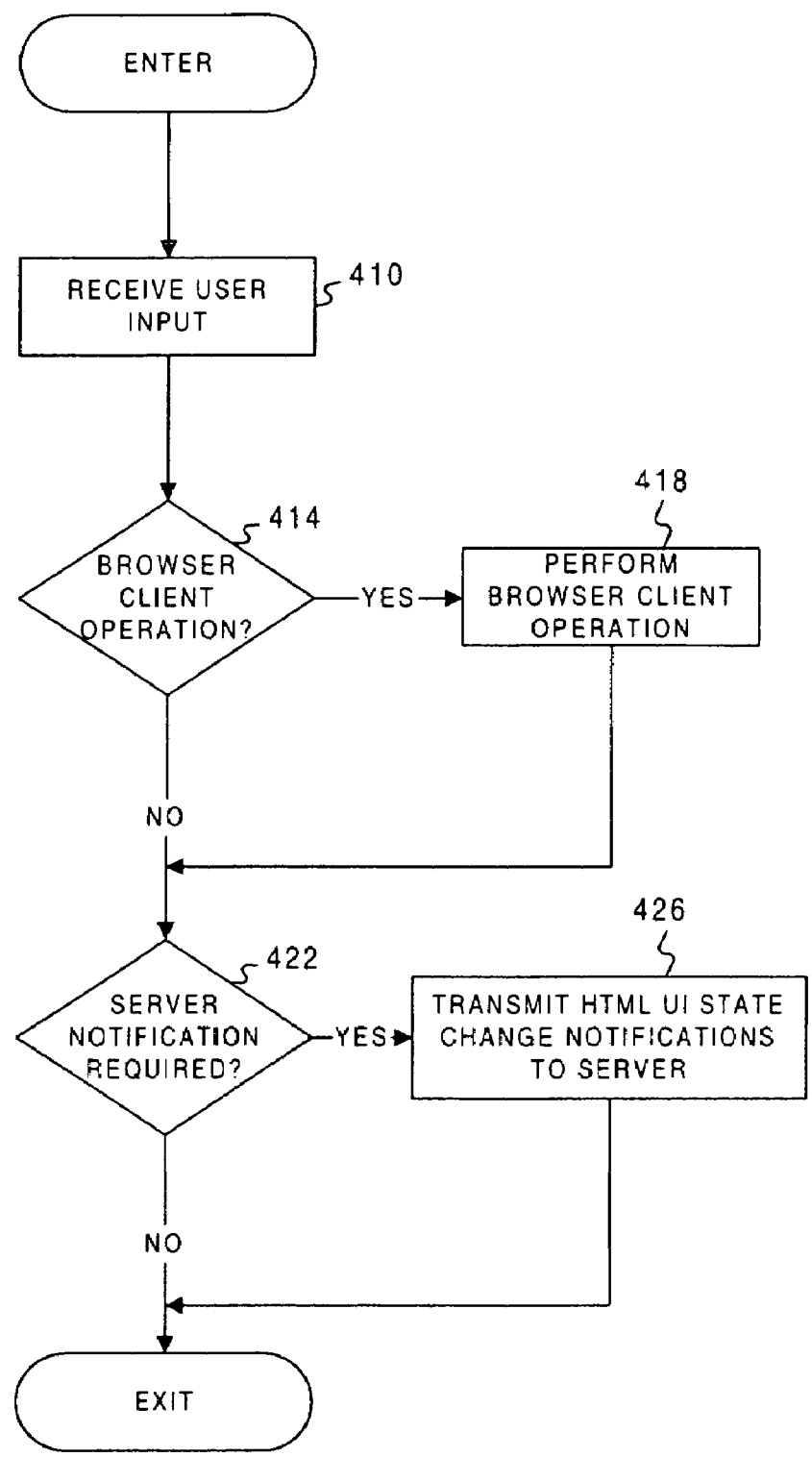
FIG. 4 is a flow chart showing the processing performed by a browser client in response to information received from a network accessing system.

FIG. 4 is a flowchart showing the functions performed by the browser client 122. When browser client 122 receives user input (step 410), a determination is made as to whether the user request requires local processing in the STB 118 (step 414). If it is to be handled locally, the operation is performed (step 418). For example, if the user has made a selection, browser client 122 may highlight the selection by altering the display locally at STB 118.

Browser client 122 displays immediate feedback for "simple" user interactions. Even then, only the user interface components that are subject to change are rendered in STB 118 (e.g., the actual radio buttons, checkboxes, etc.). This enables immediate graphics-level feedback when the user manipulates the user interface of the browser.

Whether a local response is required or not, browser client 122 also determines whether any information regarding the user input should be sent to Web browser server 114 (step 422). If Web browser server 114 is to be notified, HTML state change notifications are transferred to Web browser server 114 over channel 130. Alternatively, browser client 122 may send all user interface state changes back to Web browser server 114, and the appropriate action may then be taken.

Everything that does not need to change immediately, however, is rendered in browser core 110. Browser core 110 changes the page in accordance with the received HTML UI state change notifications, and then sends the revised page to STB 118 for display on the television. Of course, if the user selection is a Web page hotlink, the requested hotlink is transferred to Web browser server 114 over path 130.

Figure 5:
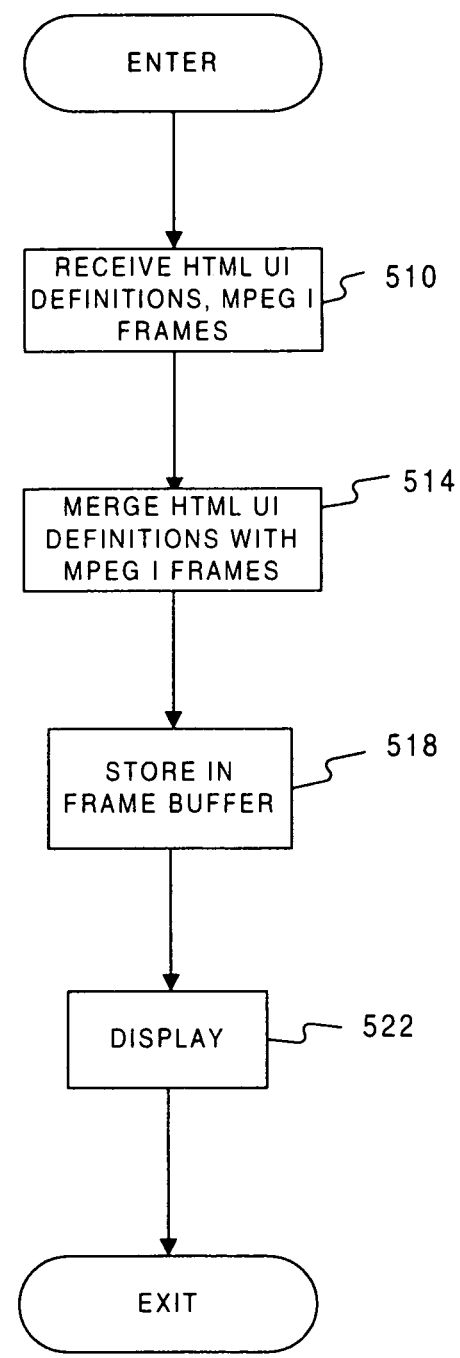
FIG. 5 is a flow chart showing the processing performed by a browser client in response to receiving input from the user.

FIG. 5 is a flow chart showing the processing performed when STB 118 receives image information from browser core 110 (via client interface 112). STB 118 receives HTML UI definitions and MPEG I-Frames from client interface 112 (step 510), recomposes the page by merging user interface information, based on the HTML UI definitions, with the MPEG I-Frames (step 514), stores the results in a frame buffer (step 518), and displays the results (step 522).

Television 146 is a standard television. STB 118 transmits a regular television signal to television 146 for display. The Internet link to television 146 is provided virtually by sending Web content over the cable.

In accordance with the invention, as illustrated in FIG. 1, Internet Web browsing is integrated with television-hosted services. Web access is therefore obtained using non-traditional devices such as a television. Browser core 110 is structured so that computationally intensive aspects remain on a remote server, while the user interaction intensive aspects are hosted on the client device, such as set-top box 118.

Figure 6:
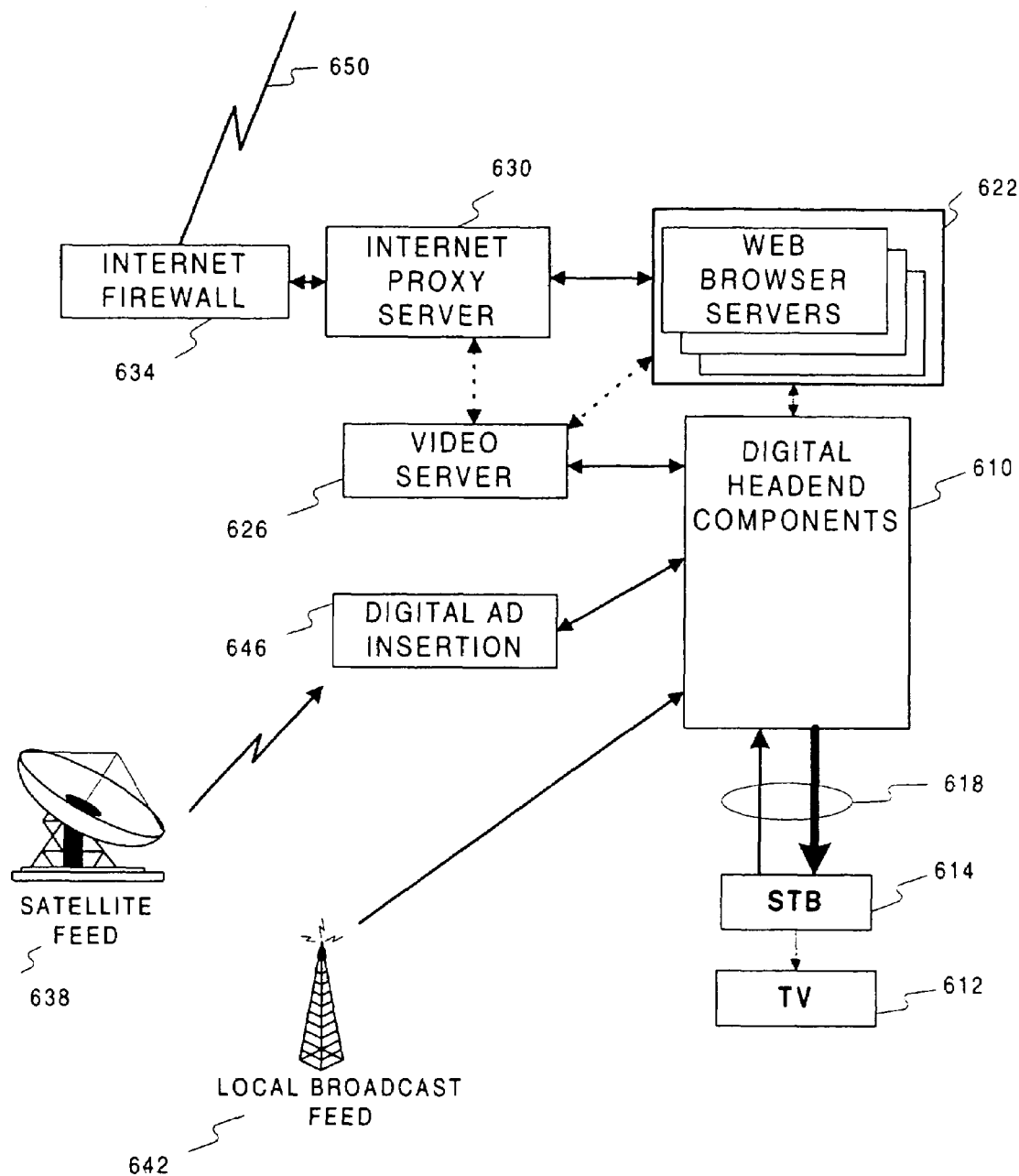
FIG. 6 is a simplified view of a headend plant consistent with a preferred embodiment of the invention.

FIG. 6 is a block diagram showing a system like Web browser server 114 of FIG. 1 in the context of a cable-TV headend. STB 614 is connected to television 612. Digital headend components 610 are connected to STB 614 via HFC 618. Digital headend components 610 comprise standard cable-TV headend components for receiving information from a variety of sources and providing the information to STB 614 in accordance with selection information from STB 614. FIG. 6, like FIG. 1, is representative of a larger system having multiple STBs 614 connected to digital headend components 610 via HFC 618.

Web browser servers 622 correspond to Web browser server 114 in FIG. 1. Multiple Web browser servers 622 are shown in FIG. 6 to emphasize that Web browsers 622, such as Web browser server 114, support multiple users simultaneously having Internet accessing sessions. Web browser 622 accesses the Internet via Internet proxy server 630, Internet firewall 634 and high speed Internet link 650, as is commonly understood in the art.

Other sources of television content, such as video server 626, satellite feed 638 (via digital ad insertion 646) and local broadcast feed 642, provide information to digital headend components 610. Digital ad insertion 646 provides well-known ad insertion functions.

Video server 626 in a preferred embodiment provides video on demand to digital headend components 610. Video server may also interact with Web browser servers 622 to handle video content from the Internet, as indicated by the connections between video server 626, Internet proxy server 630, and Web browser servers 622. Under direction of Web browser servers 622 and digital headend components 610, video server 626 may retrieve, process and store video information from the Internet.

Figure 7:
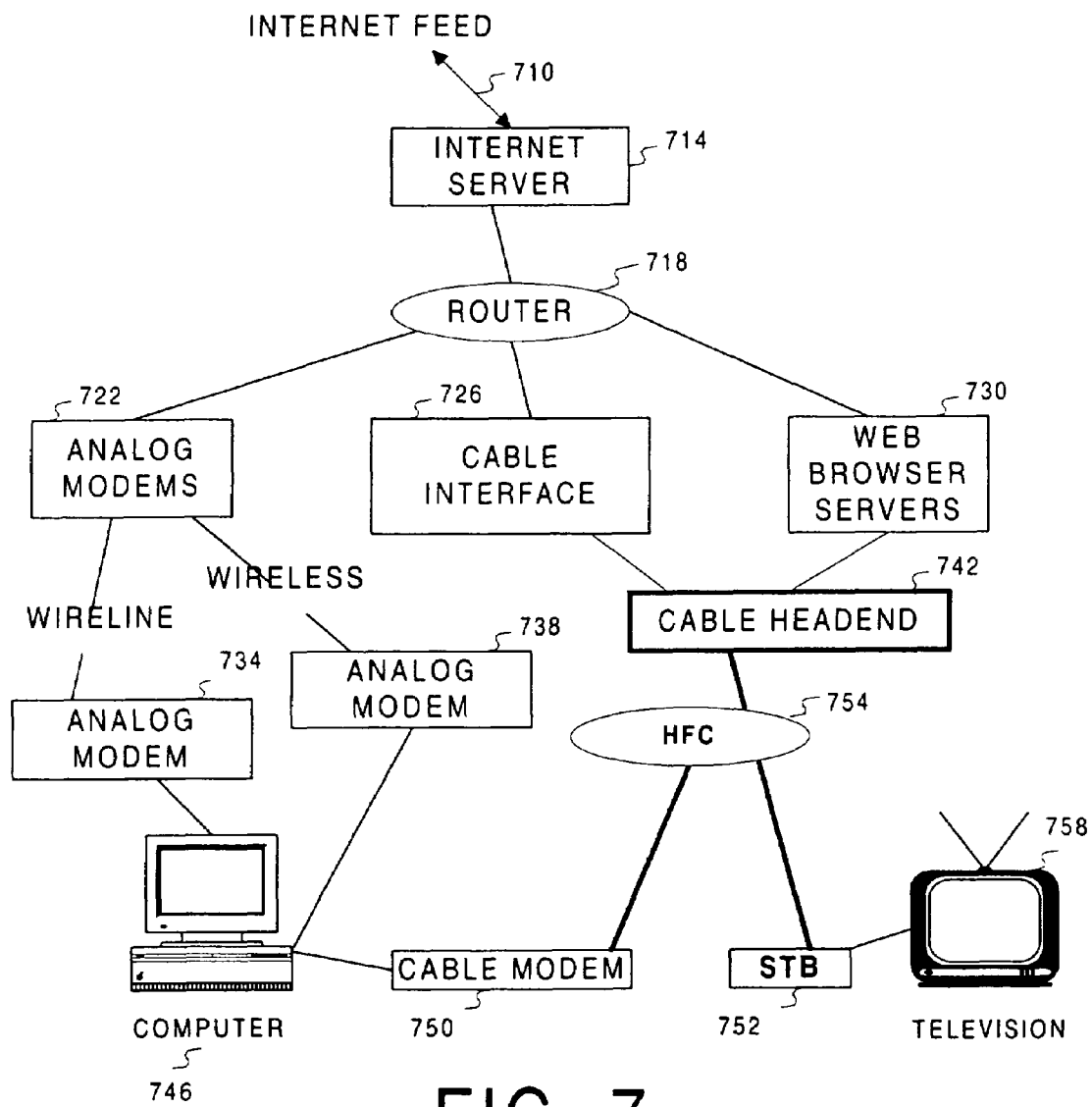
FIG. 7 shows a system which integrates several services consistent with a preferred embodiment of the invention.

FIG. 7 is a block diagram showing a system that integrates Internet access services. STB 752 and television 758 access the Internet using HFC 754, cable headend 742, web browser servers 730, router 718, Internet server 714, and Internet feed 710. In this architecture, however, the user service information (e.g., FIG. 3) is tracked in Internet server 714 instead of Web browser servers 730.

In the architecture of FIG. 7, Web browser servers 730 receive Web page requests from STB 752, and provide the requests to Internet server 714 via router 718. Internet server 714 retrieves the requested page and sends it to Web browser servers 730. Web browser servers 730 then translates the page, as discussed above with respect to FIG. 1, and transmits the HTML UI definitions and MPEG I-Frames to STB 752 via cable headend 742 and HFC 754.

FIG. 7 also shows other representative paths a user may use to access the Internet. Router 718 provides a communication path to analog modems 722. Analog modems 722 may be connected by wireline or wireless to modems 734 and 738, respectively. The modems are connected to computer 746. Using this route, a user may access the Internet in the traditional way, by computer.

Finally, router 718 is connected to cable interface 726. In a preferred embodiment, cable interface 726 is a cable modem. Computer 746 may also access the Internet via cable modem 750, HFC 754, cable headend 742, cable interface 726, router 718, and Internet server 714.

In this embodiment, computer 746 may contain a full browser. Even though the browser would function like a regular browser, session information tracking and Web page retrieval would be carried out by Internet server 714.

Alternatively, computer 746 may use a browser client (not shown) that functions in a manner similar to browser client 122 of STB 118. In this instance, the browser client has characteristics of a regular Web browser, but Internet access and retrieval is handled by Internet server 714. That is, computer 746 has a browser client that receives image information from Internet server 714 for display on the computer monitor, and also responds to user input. In response to user input, the browser client may recompose the displayed information, and send HTML UI state change notifications to Internet server 714.

Whatever route is chosen, all Internet access goes through Internet server 714. Internet server 714 handles the user service information, as shown in FIG. 3. Because Internet server 714 captures information from each session for each user, a user may always begin where the last session left off, irrespective of which device is used to access the Internet.

An example illustrates a use of the architecture shown in FIG. 7. A subscriber might browse the Web from their television 758 and locate a page that is interesting. The page, however, contains dense text and links to down-loadable files, which may not be best viewed on television 758. The subscriber uses a remote control input device and STB 752 to create a new bookmark, which is captured in the user service information (FIG. 3) by Internet server 714. The next day, the user may access the Web from subscriber computer 746. The bookmark defined the previous evening is available, allowing the user to read and down-load the materials using computer 746. The preferred embodiment also allows a subscriber's electronic mail (FIG. 3) to be available in a completely consistent form at both the computer 746 and the television 758.

Alternatively, a subscriber using a Web browser on computer 746 may locate a site that is better viewed from television 758. This might be a site with attached MPEG data, a page with a large number of different colors, or simply a page with layout hints optimized for television 758. The subscriber sets a bookmark so that the site can be easily found from television 758. Similar integration may be used for a variety of other technologies, such as voice mail, PDA's, and other communication or content devices.

Figure 8:
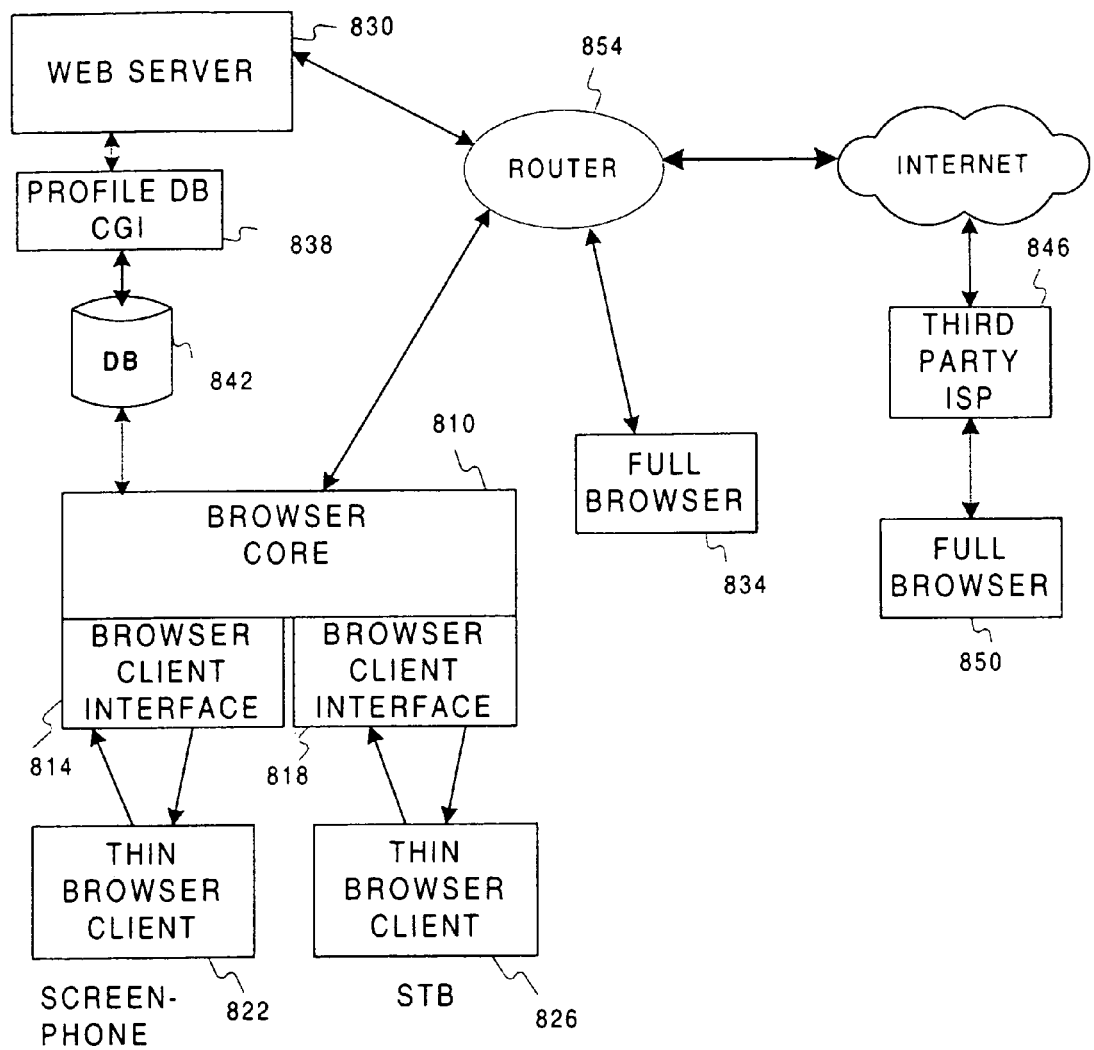
FIG. 8 is a block diagram of a system in accordance with a preferred embodiment which provides integrated access to the Web.

FIG. 8 is a block diagram of an architecture using a browser core consistent with the present invention. Browser core 810 performs functions similar to those described above with respect to browser core 110 of FIG. 1. The architecture of FIG. 8, however, stores user service information (See, e.g., FIG. 3) in user profile database 842. Session manager 154 of browser core 810 accesses and updates the database 842 to manage each user session. This allows several different types of browser clients 822 (e.g., screenphone) and 826 (e.g., an STB), via client interfaces 814 and 818, respectively, to access the Internet, and save session information regarding the access. Browser clients 822 and 826 represent a variety of user interface devices which may be used in accordance with the principles described herein.

Web server 830, via profile database common gateway interface (CGI) 838, also uses database 842 to store and retrieve user service information. Using Web server 830, full browsers 834, via router 854, and 850, via third party ISP 846, the Internet and router 854, may have Internet access sessions using Web server 830. Information regarding each session is captured in database 842.

User profile information is maintained in database 842 by browser core 810. Profile database Common Gateway Interface (CGI) 838 accesses the database to assist web server 830 in managing sessions. By capturing in database 842 how an individual is accessing the Web from different devices, integrated service is provided. Profile database 842 may be implemented as a database, as simply a set of flat files, or as any other available database, and may store a variety of user profile data.

Examples of Integrating External Services

Integrating external services provides interfacing between Web-hosted services and services traditionally available outside the context of the Web. For example, such services may include broadcast television, telephony, and paging devices. The following discussion provides several examples of how the service integration principles in accordance with the present invention may be used in the context of a TV-hosted Web browser, and of Cable-TV service in general.

Delivery of priority mail messages. For example, an urgent e-mail message arrives while the television is being used for some other entertainment purpose. Web server 830 would transfer the e-mail notification to STB 826 via core browser 810. A notification of receipt of the messages may then be played on top of the current broadcast program. Other types of service integrating telephony services into the Web are also possible using the preferred embodiment.

Graphical user interface (GUI) platform for delivery of television video-on-demand (VOD) services. Although some VOD services are more information intensive than others, the present invention allows integrated access to various types of VOD services. Consider, for example, an on-line encyclopedia where many of the "pictures" are actually video clips. An inherent aspect of this type of content is that the interaction sequence is highly variable and subscriber initiated. To present this content in the best manner possible requires text presentations, search engines, printed output, etc. The Web provides the client with the information framework necessary to access this sort of VOD content.

For example, one VOD service may provide access to video and text content developed by master chefs. Conceptually, the video content consists of segments of home-cooking shows. A Web-based GUI is used to access the service's on-line database of cooking information based, at least in part, on information given in a home cooking show. The subscriber can locate information based on ingredients (e.g., find all instances of chicken cooked with garlic), chefs, meal course (e.g., appetizer, main, desert, etc.), cuisine, nutritional information, and many other criteria. Once located, the user views static images of the meal, view printed recipes, and, when available, view a segment of a cooking show on the television using VOD controls.

This "Video Chef" example is really just one example of a class of subscriber-initiated video services. Several others, such as home repair, auto repair, info-tainment (access to Discovery-channel type programming in a VOD fashion), business, home environment and educational services may also be accessed using the integrated system of access devices disclosed herein.

Screen phone with voice and textual information access. Both live video and live voice communication applications can be carried out using the STB and home television.

In effect, the television-hosted Web browser is a platform for developing important classes of STB applications. HTML and browser technology provide an easier and a richer environment for development than attempting direct STB coding of Web accessing.

Electronic program guide (EPG). Electronic program guides vary tremendously in their graphical sophistication. The basic functionality of an EPG is straight-forward: present a catalog of what is viewable now and in the future, and provide a mechanism for tuning to a desired program. In the preferred embodiment, an EPG is implemented using HTML. A Web hosted EPG provides a smaller STB footprint, a consistent user interface, easier database management, etc. The EPG display might have a button or other control that switches the display to the Web browser and visa versa. The EPG may also be implemented co-resident in the STB with browser-related software.

An EPG (based on the Web or otherwise) provides a link from a graphical user interface to program material. These links may also go the other way. A subscriber viewing a news show that contains a Web site address may push a "bookmark" button on her remote control to note the address. The URL is captured automatically and, following a brief on-screen notification, the bookmark is saved. Later that evening, after viewing the remainder of the new show, the subscriber tunes to the Web channel and uses the stored bookmark to navigate quickly to the advertised address.

The service integration scenarios presented here suggest an integration of the traditional cable service with the Web starting at the headend, through the transport, the channel tuner, and finally to the television. According to the present invention, however, the Web browser and the broadcast services share much of the same plant (i.e., video server, HFC channel, STB, television, etc.). The integration at the physical plant level in accordance with this invention facilitates sharing of information that is required for a truly integrated service. Also, providing the Web browser over the same physical plant is an integration service to the subscriber in and of itself.

While the focus of the discussion has been on integration as it relates to Web-TV, the principles embodied herein of using thin clients may also be used to integrate other services. For example, thin client browsers can interface services like game consoles, wireline telephones via screen-phones, cellular telephones, pagers, and PDAs.

V. CONCLUSION

Other embodiments of the invention will be apparent to those skilled in the art from consideration of the specification and practice of the disclosed embodiments. The specification and examples are exemplary only, and the true scope and spirit of the invention is defined by the following claims and their equivalents.

We claim:

1. A system comprising:
a hybrid fiber-coax (HFC) network;
a headend connected to the HFC network and configured to transmit digital video signals over the HFC network
a video server connected to the HFC network and configured to store video and transmit video on demand;
an Internet access system connected to the headend and configured to receive first requested information, create second requested information based on the first requested information, and transmit the second requested information over the HFC network;
a user interface device connected to the HFC network and a display device, the user interface device configured to receive digital video signals over the HFC network, receive the second requested information from the Internet access system over the HFC network, perform recomposition on the second requested information to create third requested information, store the third requested information in a buffer, and transmit the third requested information from the buffer to a display device in a display device signal format;
wherein the second requested information is created based on a display capability of the display device;
wherein the Internet access system is further configured to store session information wherein the session information includes a current state of a current session with the user interface device, receive bookmark requests from the user interface device and set a bookmark that permits a user to access the current session at the current state on an alternate display device different than the display device.

2. The system of claim 1, wherein the user interface device is a set-top box and the display device is a television.

3. The system of claim 1, wherein the user interface device includes a browser client and the Internet access system includes a browser server having a client interface, and wherein the client interface creates the second requested information and transmits the second requested information to the browser client.

4. The system of claim 1, wherein the Internet access system is configured to create the second requested information by scanning the first requested information for interactive elements, removing the interactive elements to create a resulting display signal, encoding the interactive elements and encoding the resulting display signal, and wherein the second requested information includes the encoded interactive elements and the encoded resulting display signal.

5. The system of claim 4, wherein the encoded interactive elements are encoded as HyperText Markup Language (HTML) definitions and the encoded resulting display signal is encoded as at least one MPEG I-frame.

6. The system of claim 1, wherein the first requested information comprises a Web-based service accessible via a Uniform Resource Locator.

7. The system of claim 1, wherein the display capability is at least one of a resolution of the display and a color capability of the display.

8. The system of claim 1, wherein the user interface device is further configured to transmit state change information to the Internet access system and transmit bookmark requests to the Internet access system.

9. The system of claim 1, wherein the Internet access system includes a browser server and an Internet server, wherein the Internet server stores the bookmark.

10. The system of claim 1, wherein the Internet access system includes a browser server and a database, wherein the database stores the bookmark.

11. The system of claim 1, wherein the Internet access system is further configured to store user preference information, wherein the user preference information includes at least one of recently accessed pages and frequently accessed pages.

12. A system comprising:
a hybrid fiber-coax (HFC) network;
a headend connected to the HFC network and configured to transmit digital video signals over the HFC network
a video server connected to the HFC network and configured to store video and transmit video on demand;
an Internet access system connected to the headend and configured to receive first requested information, create second requested information based on the first requested information, and transmit the second requested information over the HFC network
a user interface device connected to the HFC network and a display device, the user interface device configured to receive digital video signals over the HFC network, receive the second requested information from the Internet access system over the HFC network, perform recomposition on the second requested information to create third requested information, and transmit the third requested information to a display device;

wherein the second requested information is created based on a display capability of the display device, and wherein the Internet access system is further configured to store session information, the session information including a current state of a current session with the user interface device, receive bookmark requests from the user interface device and set a bookmark that permits a user to access the current session at the current state on an alternate display device different than the display device.

13. The system of claim 12, wherein the user interface device is further configured to transmit state change information to the Internet access system and transmit bookmark requests to the Internet access system.

14. The system of claim 12, wherein the Internet access system includes a browser server and an Internet server, wherein the Internet server stores the bookmark.

15. The system of claim 12, wherein the Internet access system includes a browser server and a database, wherein the database stores the bookmark.

16. The system of claim 12, wherein the Internet access system is further configured to store user preference information, wherein the user preference information includes at least one of recently accessed pages and frequently accessed pages.

17. The system of claim 12, wherein the user interface device is a set-top box and the display device is a television.

18. The system of claim 12, wherein the user interface device includes a browser client and the Internet access system includes a browser server having a client interface, and wherein the client interface creates the second requested information and transmits the second requested information to the browser client.

19. The system of claim 12, wherein the Internet access system is configured to create the second requested information by scanning the first requested information for interactive elements, removing the interactive elements to create a resulting display signal, encoding the interactive elements and encoding the resulting display signal, and wherein the second requested information includes the encoded interactive elements and the encoded resulting display signal.

20. The system of claim 19, wherein the encoded interactive elements are encoded as HyperText Markup Language (HTML) definitions and the encoded resulting display signal is encoded as at least one MPEG I-frame.

21. The system of claim 12, wherein the first requested information comprises a Web-based service accessible via a Uniform Resource Locator.

22. The system of claim 12, wherein the display capability is at least one of a resolution of the display and a color capability of the display.

* * * * *